US011533327B2

(12) United States Patent
Weber et al.

(10) Patent No.: US 11,533,327 B2
(45) Date of Patent: *Dec. 20, 2022

(54) METHOD AND DEVICE FOR INTRUSION DETECTION IN A COMPUTER NETWORK

(71) Applicant: Robert Bosch GmbH, Stuttgart (DE)

(72) Inventors: Andreas Weber, Weissach (DE); Janin Wolfinger, Birkenfeld (DE); Jens Gramm, Tuebingen (DE); Michael Herrmann, Dusseldorf (DE); Wolfram Gottschlich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

This patent is subject to a terminal disclaimer.

(21) Appl. No.: 16/922,232

(22) Filed: Jul. 7, 2020

(65) Prior Publication Data

US 2021/0014257 A1 Jan. 14, 2021

(30) Foreign Application Priority Data

Jul. 10, 2019 (DE) .......................... 102019210223.9

(51) Int. Cl.
*H04L 9/40* (2022.01)
*H04L 69/22* (2022.01)
*H04L 67/12* (2022.01)
*H04L 69/325* (2022.01)
*H04L 69/324* (2022.01)

(52) U.S. Cl.
CPC ...... *H04L 63/1425* (2013.01); *H04L 63/0227* (2013.01); *H04L 67/12* (2013.01); *H04L 69/22* (2013.01); *H04L 69/324* (2013.01); *H04L 69/325* (2013.01)

(58) Field of Classification Search
USPC .......................................................... 726/23
See application file for complete search history.

(56) References Cited

U.S. PATENT DOCUMENTS

| 10,701,002 | B1* | 6/2020 | Schroder | H04L 47/2441 |
| 2005/0157664 | A1* | 7/2005 | Baum | H04L 63/104 |
| | | | | 370/256 |
| 2008/0016208 | A1* | 1/2008 | Treinen | H04L 63/1416 |
| | | | | 709/224 |
| 2008/0071779 | A1* | 3/2008 | Mammen | G06F 16/24568 |

(Continued)

FOREIGN PATENT DOCUMENTS

JP 2005507612 A * 8/2003 ............. H04L 12/56

*Primary Examiner* — Sakinah White Taylor
(74) *Attorney, Agent, or Firm* — Norton Rose Fulbright US LLP; Gerard Messina

(57) ABSTRACT

Device and method for intrusion detection in a computer network. A data packet is received at an input of a hardware switch unit, an output of the hardware switch unit being selected for sending the data packet or a copy as a function of data link layer information from the data packet and of a hardware address from a memory of the hardware switch unit. An actual value from a field of the data packet is compared by a hardware filter with a setpoint value for values from this field, the field including data link layer data or network layer data, and the data packet or a copy of the data packet being provided to a computing device as a function of a result of the comparison. The analysis for detecting an intrusion pattern in a network traffic in the computer network id carried out by the computing device.

12 Claims, 3 Drawing Sheets

(56) References Cited

U.S. PATENT DOCUMENTS

| | | | | |
|---|---|---|---|---|
| 2008/0201772 A1* | 8/2008 | Mondaeev | .............. | H04L 47/12 |
| | | | | 726/13 |
| 2009/0106842 A1* | 4/2009 | Durie | .................... | H04L 63/20 |
| | | | | 726/25 |
| 2012/0218901 A1* | 8/2012 | Jungck | ................ | H04L 63/0263 |
| | | | | 370/241 |
| 2015/0127790 A1* | 5/2015 | Smith | ................. | H04L 41/0873 |
| | | | | 709/221 |
| 2015/0326534 A1* | 11/2015 | Guo | ....................... | H04L 47/34 |
| | | | | 726/13 |
| 2018/0034912 A1* | 2/2018 | Binder | ..................... | H04L 67/12 |
| 2019/0059055 A1* | 2/2019 | Murali | .............. | H04W 52/0229 |

* cited by examiner

METHOD AND DEVICE FOR INTRUSION DETECTION IN A COMPUTER NETWORK

CROSS REFERENCE

The present application claims the benefit under 35 U.S.C. § 119 of German Patent Application No. DE 102019210223.9 filed on Jul. 10, 2019, which is expressly incorporated herein by reference in its entirety.

FIELD

The present invention is directed to a method and to a device for intrusion detection in a computer network.

BACKGROUND INFORMATION

The task of such a "Network Intrusion Detection and Prevention System" (NIDPS) is to identify and to respond to anomalies in the network traffic of a distributed computer system. NIDPS are systems that are typically used to detect and to prevent intrusions in corporate networks, so-called enterprise networks. NIDPS may also be used in automotive networks. Automotive networks are internal networks of vehicles that include "Electronic Control Units" (ECUs) as network nodes.

Due to functional differences between enterprise networks and automotive networks, NIDPS for enterprise networks are unable to be efficiently used for automotive networks.

It is therefore desirable to provide an NIDPS for an automotive network.

SUMMARY

This may be achieved in accordance with example embodiments of the present invention.

In order to provide an NIDPS for an automotive network, differences between automotive networks and enterprise networks should be taken into account. These differences are to found in their network structure, network dynamics and the network nodes.

Network Structure:

An enterprise network typically follows a client-server model, in which there is a smaller number of dedicated server-network nodes, which offer services to a typically higher number of client-network nodes. Automotive networks are made up of ECUs, which exchange sensor signals and actuator commands.

Enterprise networks are, in general, significantly larger and more complex than automotive networks. The totality of an enterprise network is significantly more segmented, physically or logically separated into different zones and sub-networks. ECUs in typical automotive networks are, if at all, separated by "gateways" into a few sub-networks or logically separated at the Ethernet level via so-called "Virtual Local Area Networks" (VLANs).

Network Dynamics:

Enterprise networks and automotive networks differ in terms of their dynamics with which the network is changed and operated.

In enterprise networks, the connected network nodes change dynamically. For changes in server-network nodes, an adaptation in the configuration of the security systems such as, for example, the NIDPS, may potentially also be carried out. In contrast, such adaptations in network nodes, which are clients, are generally not possible. This is due to the fact that some clients are connected to the network from alternating locations and are interchanged relatively frequently. It is also not possible to predict which applications are executed on a client.

ECUs in automotive networks are interchanged very rarely, if at all, and are then frequently also replaced by an identical copy. It is therefore unlikely that anything changes in the functionality of the network. In an automotive network, the network nodes are known without exception. The respectively running applications on the network are also well defined and details about the network communication may be predefined.

In enterprise networks, it is also customary for nodes to establish connections into an enterprise network from the outside and to represent a part of the internal data traffic. In an automotive network, all communication nodes of the network responsible for the vehicle functions are part of the internal vehicle network. External nodes are granted access to the internal vehicle network only for specific functions and in limited scope, for example, for diagnosis or for mobile terminals.

In enterprise networks, different users may potentially use the same client. In ECUs of automotive networks, there are no users, but merely applications, which perform their service fully automatically.

Network Nodes:

With regard to resources, the network nodes of an enterprise network are, in general, multiple times more resource-intensive —for example with respect to memory and performance—than ECUs of an automotive network.

With regard to the software, the network nodes in enterprise networks are usually equipped with widely common standard operating systems and standard software, for which security weaknesses are known. In general, however, it is not possible to establish which software is executed on which client system since, in many cases, users are able to install and uninstall software. For this reason, a key focus of NIDPS systems in enterprise networks is to detect in a signature-based manner whether the attempt is being made to exploit known security weaknesses. The network nodes in automotive networks are generally equipped with software that has been specifically developed for this particular application. A majority of the signatures from NIDPS systems for enterprise networks is not usable, and there are no larger databases relating to weaknesses known specifically for automotive networks.

The fundamental task of an NIDPS, i.e., detecting and responding to anomalies in the network traffic, is the same in enterprise networks and automotive networks. However, it is apparent from the aforementioned points that the basic functionality of an efficient NIDPS for automotive networks should differ fundamentally from that of an NIDPS for enterprise networks. An NIDPS for an automotive network must take advantage of the known and static network structure as well as of the significantly lower dynamics of the network users, in order to be able to efficiently detect anomalies with limited resources.

In accordance with an example embodiment of the present invention, a method particularly advantageous in this regard for intrusion detection in a computer network provides that a data packet is received at an input of a hardware switch unit, an output of the hardware switch unit for sending the data packet or a copy of the data packet being selected as a function of data link layer information from the data packet and as a function of a hardware address from a memory of the hardware switch unit, an actual value from a field of data packets being compared in a comparison by a hardware filter with a setpoint value for values from this field, the field including data link layer data or network layer data, and the data packet or a copy of the data packet being provided to a processing unit for analysis as a function of a result of the comparison, the analysis for detecting an intrusion pattern in a network traffic in the computer network being carried out as a function of information from the data packet. In this way, an NIDS is implemented by the analysis of data packets that have been classified as suspicious by the switch hardware. The NIDS is implementable on a switch CPU without analyzing the entire network traffic on the switch CPU. The switch hardware analyzes each data packet of the network traffic to OSI layer 2 and in some systems in part also OSI layer 3 in order to implement the switching. If anomalies in a data packet are established in this analysis, the data packet is forwarded to the switch CPU. The switch CPU further analyzes the data packet and implements a stateless or stateful NIDS based on the analysis results. This two-stage NIDS is very resource-efficient and is particularly suited for automotive networks. For example, it is checked in the comparison whether a deviation is present between the actual value and the setpoint value, or reaches, exceeds or falls below a threshold value.

It is preferably provided that the hardware filter includes a Ternary Content Addressable Memory, in which a mask for the setpoint value is stored, the actual value being compared with the mask stored in the Ternary Content Addressable Memory, and it being established as a function of the result of the comparison whether or not a deviation is present. This makes it possible to check freely-configurable properties of the data packets in the first stage of the NIDS.

The setpoint value preferably characterizes a hardware address from the memory, in particular, a Medium Access Control address, the actual value being determined as a function of data from a hardware address field, in particular a Medium Access Control address of a data packet at the input or output. In this way, it is possible to evaluate an irregularity with respect to the Medium Access Control address in the first stage of the NIDS.

The setpoint value preferably characterizes a Virtual Local Area Network, the setpoint value being determined from the memory, the actual value being determined as a function of data, which characterize the association of a data packet at the input or output with a Virtual Local Area Network. In this way, it is possible to evaluate an irregularity with respect to the association with a Virtual Local Area Network in the first stage of the NIDS.

The presence of a deviation is preferably detected, either when the hardware filter at the input or output for a tagged Virtual Logical Area Network establishes an untagged Virtual Logical Area Network data packet, or when the hardware filter at the input or output for an untagged Virtual Logical Area Network establishes a tagged Virtual Logical Area Network data packet. This makes it possible to detect further irregularities with respect to the Virtual Logical Area Network in the first stage of the NIDS.

The presence of a deviation is preferably detected when the hardware filter at the input or output establishes a data packet having an unknown Ethertype, including a false checksum, a false packet length or a false packet structure. This makes it possible to detect further irregularities in the structure or content of the data packet in the first stage of the NIDS.

The presence of a deviation is preferably detected when a Dynamic Host Configuration Protocol filter at the input or output establishes a Dynamic Host Configuration Protocol packet for Internet Protocol Version 4 and/or for Internet Protocol Version 6 including Dynamic Host Configuration Protocol port 67 and/or port 68, a Transmission Control Protocol or User Datagram Protocol filter at the input or output establishes a Transmission Control Protocol or User Datagram Protocol Broadcast message for Internet Protocol Version 4 and/or for Internet Protocol Version 6, a Precision Time Protocol filter at the input or output establishes a Precision Time Protocol message, the content of which, in particular, time stamp, sequence number, correction field, is stored at least temporarily in a register for context information. This makes it possible to detect a protocol-specific irregularity with respect to the data packet in the first stage of the NIDS.

In accordance with an example embodiment of the present invention, a device for intrusion detection in a computer network is designed as a system on a chip system, which includes a hardware switch unit, a hardware filter and a computing device for the intrusion detection, and is designed to carry out the method. This approach is particularly well suited for automotive networks.

A Ternary Content Addressable Memory, an Address Translation Unit, a Virtual Local Area Network unit, a Dynamic Host Configuration Protocol filter, a Transmission Control Protocol or User Datagram Protocol filter and/or a Precision Time Protocol filter is/are preferably designed as a hardware filter to analyze a data packet for the intrusion detection and to provide the data packet or a copy of the data packet for the intrusion detection as a function of the result of the check. In this way, it is possible to particularly efficiently carry out aspects of the method in the switch hardware.

Additional advantageous specific embodiments result from the following description and from the figures.

DETAILED DESCRIPTION OF EXAMPLE EMBODIMENT

Figure 1:
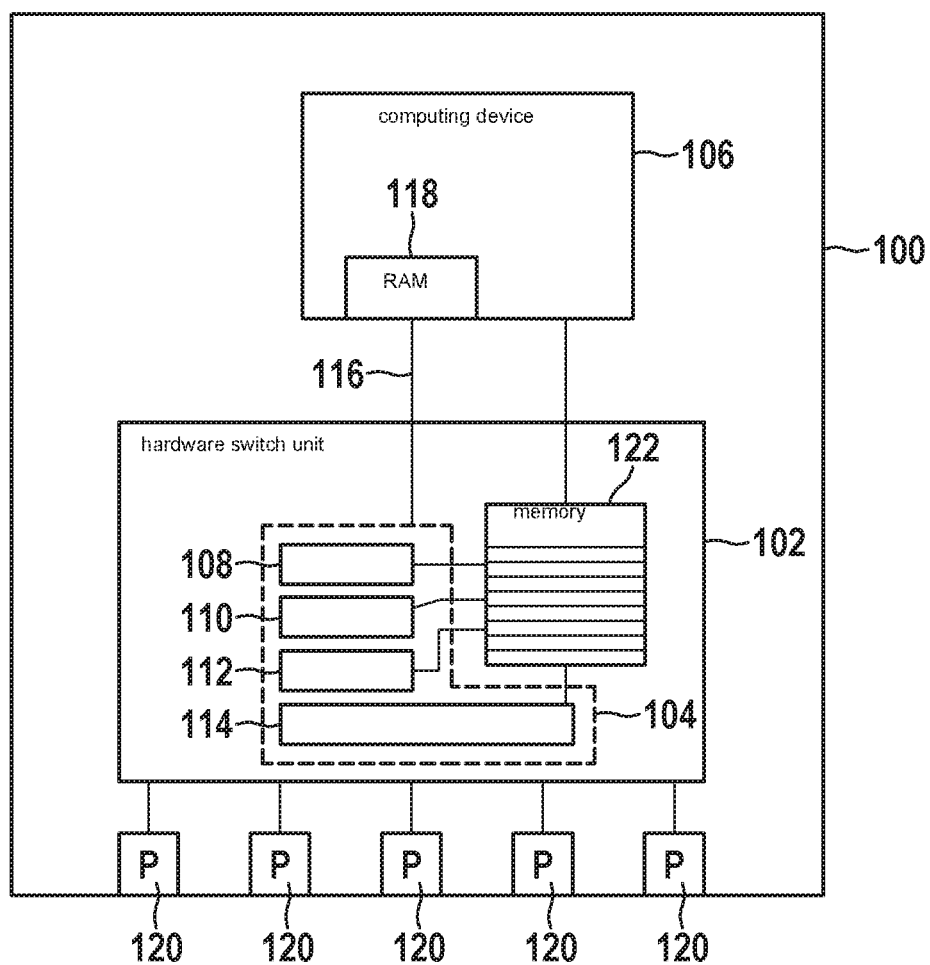
FIG. 1 schematically shows a representation of a device for intrusion detection in accordance with an example embodiment of the present invention.

FIG. 1 schematically shows a representation of a device 100 for intrusion detection in a computer network in accordance with an example embodiment of the present invention. Device 100 is designed as a system on a chip system.

Device 100 includes a hardware switch unit 102, a hardware filter 104 and a computing device 106 for the intrusion detection. Computing device 106 is described below as an example of a microprocessor. A microcontroller may also be used instead of a microprocessor.

The computer network in the example is an automotive Ethernet network. The automotive Ethernet described by way of example is based on Ethernet Standard IEEE 802.3-2018 and may include elements from IEEE 802.1Q, 100BASE-T1 or 1000BASE-T1. BroadR-Reach or 100BASE-T1/X specify the physical transport medium in layer 1. There are additional standards in the Ethernet Protocol stack, which are in part specific to the automotive context, for example, DoIP, SOME/IP and in part IPv4, TSN.

In the automotive Ethernet context, only parts of a standard are utilized in part and others not, i.e., not the entire scope of the protocol is also utilized.

Hardware switch unit 102 in the example includes an Ethernet switch.

Hardware filter 104 in the example includes a Ternary Content Addressable Memory 108, an Address Translation Unit 110, a Virtual Local Area Network Translation unit 112 and additional hardware filters 114, for example, a Dynamic Host Configuration Protocol filter, a Transmission Control Protocol or User Datagram Protocol filter and/or a Precision Time Protocol filter.

The hardware filters are designed to analyze a data packet for the intrusion detection and to provide the data packet or a copy of the data packet to microprocessor 106 for the intrusion detection as a function of the result of the check. For this purpose, hardware filter 104 and microprocessor 106 are connected to a data line 116. Microprocessor 106 in the example is part of a microcontroller, which includes a random access memory 118. Data packets are transmittable via data line 116 from hardware filter 104 into random access memory 118 for the intrusion detection.

Device 100 includes at least one input and at least one output. These are implemented as ports 120 for hardware switch unit 102.

Hardware switch unit 102 includes a memory 122 for hardware addresses of devices of the computer network, which are coupled to device 100. Memory 122 may include a register for context information relating to data packets. Memory 122 is a random access memory, for example. Memory 122 may also be a non-volatile read and write memory.

Hardware switch unit 102 is designed to receive a data packet at an input. Hardware switch unit 102 is designed to select an output of device 100 for sending the data packet or a copy of the data packet as a function of security layer information from the data packet and as a function of a hardware address from memory 122.

Microprocessor 106 is designed to carry out an analysis for detecting an intrusion pattern in a network traffic in the computer network as a function of information from the data packet.

Hardware filter 104 is designed to compare in a comparison an actual value from a field of data packets with a setpoint value for values from this field. The field includes security layer data or network layer data. Hardware filter 104 is designed to provide the data packet or a copy of the data packet to microprocessor 106 for analysis as a function of a result of the comparison if a deviation between the actual value and the setpoint value is present, or exceeds a threshold value.

Shapes of hardware filter 104 are described in the following.

Hardware filter 104 includes, for example, a Ternary Content Addressable Memory 108, in which a mask for the setpoint value is stored. Hardware filter 104 in this case is designed to compare the actual value with the mask stored in the Ternary Content Addressable Memory, and to establish as a function of the result of the comparison whether or not the deviation is present.

The setpoint value, for example, characterizes a hardware address from the memory. The hardware address is, in particular, a Medium Access Control address of the data link layer. Hardware filter 104 in this example includes Address Translation Unit 110, which is designed to determine the actual value as a function of data from a hardware address field of a data packet at an input or output of device 100, to compare the actual value in a comparison with the setpoint value, and to establish as a function of the result of the comparison whether or not the deviation is present.

Address Translation Unit 110 is a unit in the data link layer, which selects the output in hardware switch unit 102 at which a received data packet or its copy is sent during operation.

The setpoint value, for example, characterizes a Virtual Local Area Network. The setpoint value is stored in memory 122, for example. Hardware filter 104 includes a Virtual Local Area Network Translation Unit 112, which is designed to determine the actual value as a function of data, which characterize the association of a data packet at an input or output of device 100 with a Virtual Local Area Network, to compare the actual value in a comparison with the setpoint value, and to establish as a function of the result of the comparison whether not the deviation is present.

Virtual Local Area Network Translation Unit 112 is a unit in the data link layer, which selects the output in hardware switch unit 102 at which a received data packet or its copy is sent during operation in a Virtual Local Area Network.

Hardware filter 104 may be designed to detect the presence of a deviation, either when hardware filter 104 at an input or output of the device for a tagged Virtual Logical Area Network establishes an untagged Virtual Logical Area Network data packet, or when additional hardware filter 114 at an input or output of the device for an untagged Virtual Logical Area Network establishes a tagged Virtual Logical Area Network data packet.

Hardware filter 104 may be designed to detect the presence of a deviation if additional hardware filter 114 at an input or output of device 100 establishes a data packet having an unknown Ethertype, a false checksum or a false packet structure.

Hardware filter 104 may include a Dynamic Host Configuration Protocol filter as an additional hardware filter 114, which is designed to establish at the input or output of the device Dynamic Host Configuration Protocol packets for Internet Protocol Version 4 and/or for Internet Protocol Version 6 including Dynamic Host Configuration Protocol Port 67 and/or Port 68.

Hardware filter 104 may include a Transmission Control Protocol or User Datagram Protocol filter as additional hardware filter 114, which is designed to establish at the input or output of the device Transmission Control Protocol or User Datagram Protocol Broadcast messages for Internet Protocol Version 4 and/or for Internet Protocol Version 6.

Hardware filter 104 may include a Precision Time Protocol filter as additional hardware filter 114, which is designed to establish Precision Time Protocol messages at the input or output of the device, and to store their content, in particular, time stamp sequence number, correction field at least temporarily in a register for context information.

The described shapes of hardware filter 104 may be situated in parallel or in succession in hardware switch unit 102. Not all shapes of hardware filter 104 need be provided.

Hardware filter 104 is designed in one aspect to provide the data packet, the actual value of which has been compared, to microprocessor 106 if the deviation is present. In one aspect, hardware filter 104 is designed not to provide the data packet, the actual value of which has been compared, for analysis to microprocessor 106 if no deviation is present. In another aspect, hardware filter 104 is designed to compare the deviation with a threshold value and to provide the data packet, the actual value of which has been compared, to microprocessor 106 if the deviation exceeds the threshold value.

Figure 2:
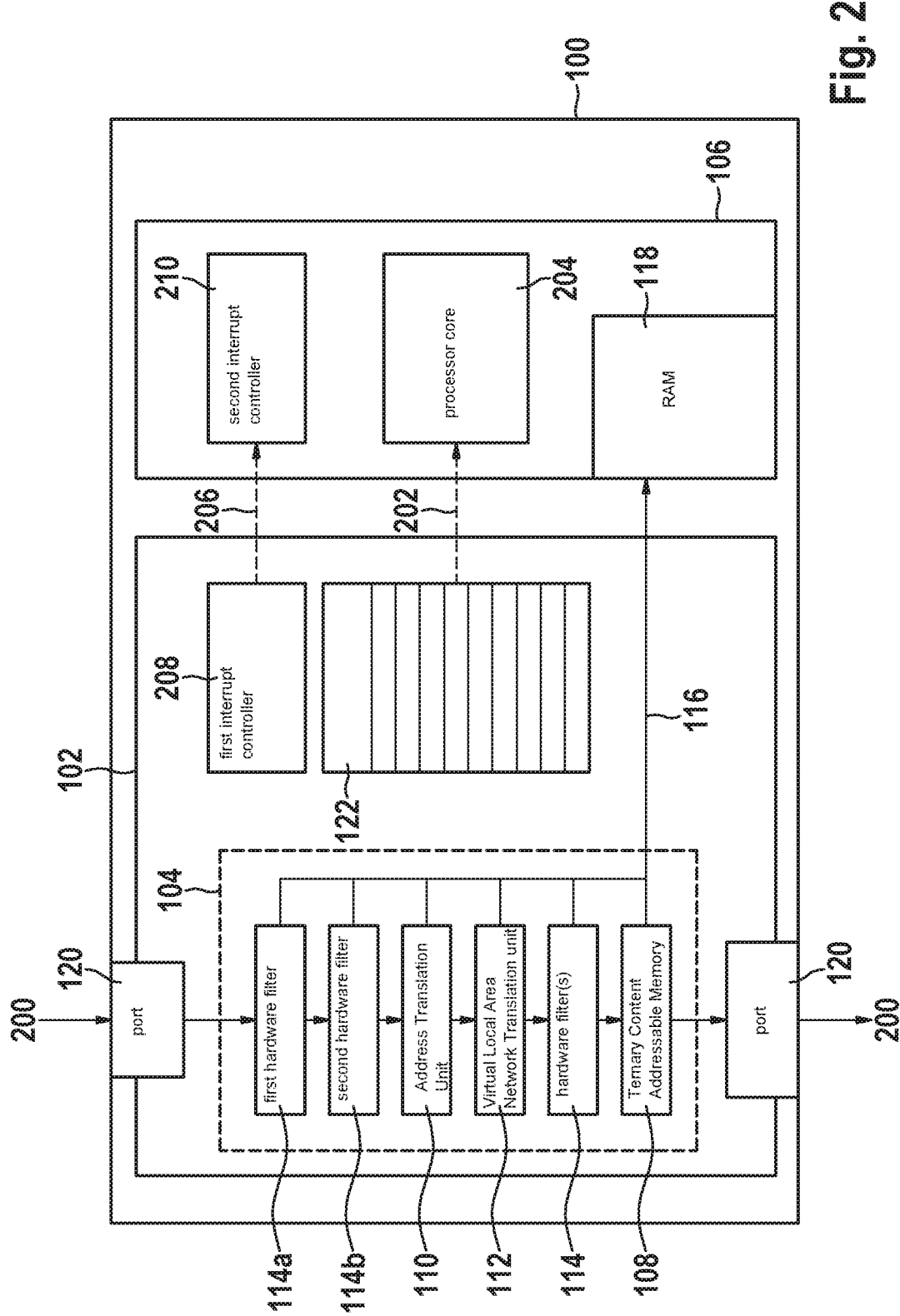
FIG. 2 shows a data flow in the device in accordance with an example embodiment of the present invention.

FIG. 2 depicts an exemplary data flow in device 100 for an Ethernet data packet 200. Ethernet data packet 200 is received at an input of device 100, i.e., in the example, at one of ports 120. Ethernet data packet 200 is sent at an output of device 100, i.e., in the example, at one of ports 120.

Between the input and the output, Ethernet data packet 200 runs through a first hardware filter 114a, which is designed to check the packet structure. First hardware filter 114a is designed to transmit the data packet via data line 116 for microprocessor 106 into random access memory 118 if the packet structure does not correspond to the setpoint structure for Ethernet data packet 200 and otherwise not to transmit Ethernet data packet 200.

Between first hardware filter 114a and the output, Ethernet data packet 200 runs through a second hardware filter 114b, which is designed to check a checksum for Ethernet data packet 200. Second hardware filter 114b is designed to transmit Ethernet data packet 200 via data line 116 for microprocessor 106 into random access memory 118, if the checksum does not correspond to a setpoint checksum for Ethernet data packet 200 and otherwise not to transmit Ethernet data packet 200.

Between second hardware filter 114b and the output, Ethernet data packet 200 runs through Address Translation Unit 110. Address Translation Unit 110 is designed to transmit the Ethernet data packet via data line 116 for microprocessor 106 into random access memory 118 if the deviation is detected and otherwise not to transmit Ethernet data packet 200. Address Translation Unit 110 in the example, also establishes port 120 for the output.

Between Address Translation Unit 110 and the output, Ethernet data packet 200 runs through Virtual Local Network Translation Unit 112. Virtual Local Network Translation Unit 112 is designed to transmit Ethernet data packet 200 via data line 116 for microprocessor 106 into random access memory 118 if the deviation is detected and otherwise not to transmit Ethernet data packet 200. Virtual Local Area Network Translation Unit 112 in the example also establishes whether or not Ethernet data packet 200 may be sent via port 120, which is established as an output, according to the rules for the Virtual Local Area Network.

The sending does not occur, for example, if port 120 for this Virtual Local Area Network is not allowed to be used.

Between Virtual Local Area Network Translation Unit 112 and the output, Ethernet data packet 200 in the example runs through additional hardware filter 114. Ethernet data packet 200 is transmitted via data line 116 for microprocessor 106 into random access memory 118 if the deviation is detected. Ethernet data packet 200 is otherwise not transmitted.

An optional first interface 202 between memory 122 and microprocessor 106, more precisely, processor core 204 of microprocessor 106 is also depicted in FIG. 2.

A second optional interface 206 between an optional first interrupt controller 208 of hardware switch unit 102 and an optional second interrupt controller 210 in microprocessor 106 are also depicted in FIG. 2.

First interrupt controller 208 is designed to send an interrupt via second interface 206 to second interrupt controller 210, if a deviation has been established in hardware filter 104.

Second interrupt controller 210 is designed to activate processor core 204 to read context information from the register in memory 122 when the interrupt is received by second interrupt controller 210.

In this case, microprocessor 106 may be designed to carry out the analysis for the detection by the microprocessor of an intrusion pattern in a network traffic in the computer network as a function of the context information.

The sequence described here is an exemplary sequence. It makes no difference in terms of the function whether, for example, first additional hardware filter 114 and then Address Translation Unit 110 is run through or vice versa. This applies for all additional named components in the sequence depicted.

Ternary Content Addressable Memory 108 may be designed for a check of the payload, i.e., for a check of a content, which goes beyond layers 2 and 3. In this aspect, payload may also be filtered.

Figure 3:
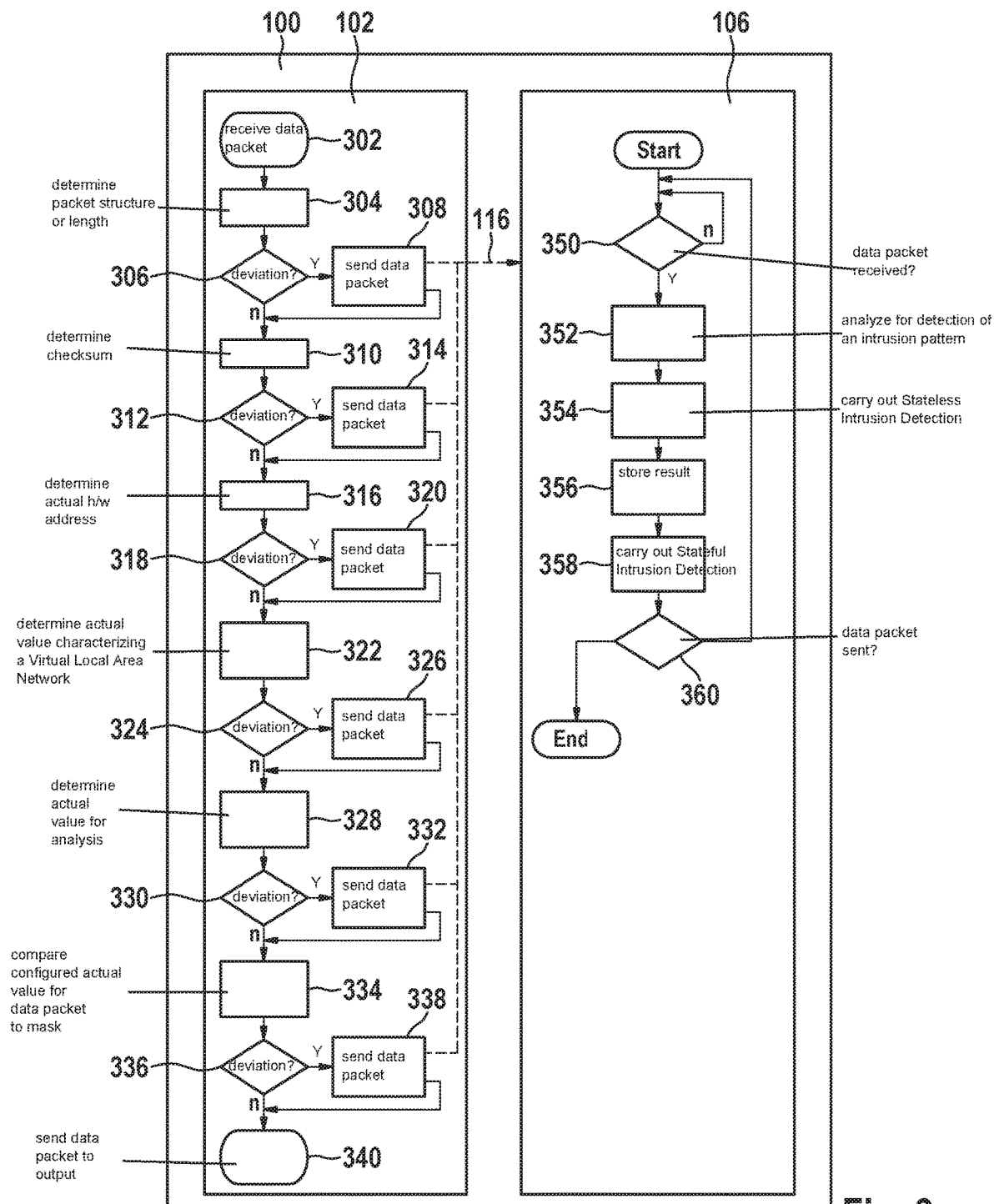
FIG. 3 shows steps in a method for the intrusion detection in accordance with an example embodiment of the present invention.

FIG. 3 depicts steps in a method for intrusion detection.

In a step 302, Ethernet data packet 200 is received at a port 120. A step 304 is subsequently carried out.

In a step 304, the packet structure or a packet length of the Ethernet data packet 200 is determined. A step 306 is subsequently carried out.

In step 306, it is checked whether a deviation of the packet structure from the setpoint structure or a deviation of a packet length from a setpoint length is present. It is checked, for example, whether an irregularity with respect to the packet structure is present.

If a deviation from the setpoint structure is present, a step 308 is carried out. If no deviation is present, a step 310 is carried out.

In step 308, Ethernet data packet 200 is sent to microprocessor 106. Step 310 is subsequently carried out.

In step 310, a checksum for Ethernet data packet 200 is determined. A step 312 is subsequently carried out.

In step 312, it is checked whether a deviation of the checksum from a setpoint checksum is present. For example, it is checked whether an irregularity with respect to the checksum is present.

If a deviation from the setpoint checksum is present, a step 314 is carried out. If no deviation is present, a step 316 is carried out.

In step 314, Ethernet data packet 200 is sent to microprocessor 106. Step 316 is subsequently carried out.

In step 316, an actual hardware address for Ethernet data packet 200 is determined. A step 318 is subsequently carried out.

In step 318, it is checked whether the actual hardware address is known, in particular, matches a hardware address from memory 122. For example, it is checked whether a known Media Access Control address is present.

If a deviation from, in particular, any hardware address known from the memory is present, a step 320 is carried out. If no such deviation is present, in particular, if the actual hardware address is known, a step 322 is carried out.

In step 320, Ethernet data packet 200 is sent to microprocessor 106. Step 322 is subsequently carried out.

In step 322, an actual value characterizing a Virtual Local Area Network is determined. A step 324 is subsequently carried out.

In step 324, it is checked whether the actual value corresponds to a setpoint value characterizing a Virtual Local Area Network, into which Ethernet data packet 200 may be sent at port 120 determined with the aid of the actual hardware address. A match to a setpoint value from memory 122, in particular, is checked.

If a deviation between actual value and setpoint value is present, a step 326 is carried out. If no such deviation is present, a step 328 is carried out.

In step 326, Ethernet data packet 200 is sent to microprocessor 106. Step 328 is subsequently carried out.

In step 328 an additional actual value for an analysis with one of the described other hardware filters is optionally determined.

At the input or output, for example, for a tagged Virtual Logical Area, an untagged Virtual Logical Area Network Ethernet data packet 200 is established, or for an untagged Virtual Logical Area Network, a tagged Virtual Logical Area Network Ethernet data packet 200 is established.

At the input or output, for example, a Dynamic Host Configuration Protocol packet for Internet Protocol Version 4 and/or for Internet Protocol Version 6 including Dynamic Host Configuration Protocol port 67 and/or port 68 is established. For example, a User Datagram Protocol Broadcast message for Internet Protocol Version 4 and/or for Internet Protocol Version 6 is established at the input or output. For example, a Precision Time Protocol message is established at the input or output, the content of which, in particular, time stamp, sequence number, correction field, being stored at least temporarily in a register for context information.

A step 330 is subsequently carried out.

In step 330, it is checked whether a deviation of the additional actual value from an additional setpoint value for the additional actual value is present. If a deviation is present, a step 332 is carried out. Otherwise, a step 334 is carried out.

In step 332, Ethernet data packet 200 is sent to microprocessor 106. Step 334 is subsequently carried out.

In step 334, a configured actual value for Ethernet data packet 200 is compared with a mask configured therefor stored in the Ternary Content Addressable Memory. A step 336 is subsequently carried out.

In step 336, it is established as a function of the result of the comparison whether or not a deviation from the mask is present. If a deviation is present, a step 338 is carried out. If no deviation is present, a step 340 is carried out.

In step 338, Ethernet data packet 200 is sent to microprocessor 106. Step 340 is subsequently carried out.

In step 340, Ethernet data packet 200 is sent at the output.

In microprocessor 106, a method additionally runs in parallel in which, after its start, it is checked in a step 350 whether an Ethernet data packet 200 is received by microprocessor 106.

If an Ethernet data packet 200 is received, a step 352 is carried out. Otherwise, step 350 is carried out.

In step 352, Ethernet data packet 200 is analyzed for detection of an intrusion pattern in the network traffic in the computer network as a function of information from Ethernet data packet 200. A step 354 is subsequently carried out.

In step 354, a Stateless Intrusion Detection is carried out as a function of information from Ethernet data packet 200. A step 356 is subsequently carried out.

In step 356, an analysis result of the Stateless Intrusion Detection is stored. A step 358 is subsequently carried out.

In step 358, a Stateful Intrusion Detection is carried out as a function of information about stored analysis results. A step 360 is subsequently carried out.

In step 360, it is checked whether Ethernet data packet 200 has been sent. If Ethernet data packet has been sent, the method is ended. Otherwise, step 350 is carried out.

What is claimed is:

1. A method for intrusion detection in a computer network, comprising the following steps:
   receiving a data packet at an input of a hardware switch that includes a plurality of ports to which a plurality of devices are network interconnectable by processing circuitry of the hardware switch, wherein the data packet includes a plurality of fields providing respective data link layer information and providing a hardware address;
   selecting, by the processing circuitry of the hardware switch, one of the plurality of ports via which to output from the hardware switch the data packet or a copy of the data packet as a function of the data link layer information and the hardware address;
   for each of the plurality of fields, comparing, by the processing circuitry of the hardware switch, a respective actual value of the respective field to a respective corresponding predefined setpoint value; and
   detecting, by the processing circuitry, whether there is an intrusion pattern in a network traffic in the computer network in response to satisfaction of a predefined condition that, for any individual one of the comparisons individually, a result of the respective comparison is that there is a predefined deviation of the respective actual value from the respective corresponding predefined setpoint value.

2. The method as recited in claim 1, wherein the hardware switch includes a Ternary Content Addressable Memory in which a mask for one of the setpoint values is stored, and wherein one of the comparisons is a comparison of one of the actual values with the mask stored in the Ternary Content Addressable Memory.

3. The method as recited in claim 1, wherein one of the setpoint values characterizes a hardware address from a memory of the hardware switch, and wherein the respective actual value that is compared to the hardware address characterizing setpoint value is determined by the processing circuitry from a hardware address field of the data packet.

4. The method as recited in claim 1, wherein one of the setpoint values characterizes a Medium Access Control address from a memory of the hardware switch, and wherein the respective actual value that is compared to the hardware address characterizing setpoint value is determined by the processing circuitry from a Medium Access Control address field of the data packet.

5. The method as recited in claim 1, wherein one of the setpoint values characterizes a Virtual Local Area Network and is determined by the processing circuitry from a memory of the hardware switch, and wherein the respective actual value that is compared to the setpoint value characterizing the Virtual Local Area Network characterizes an association of the data packet with the Virtual Local Area Network.

6. The method as recited in claim 1, wherein a result of one of the performed comparisons produces a result that indicates, as the deviation, presence of a tagged Virtual Logical Area Network data packet when the computer network is an untagged Virtual Logical Area Network, or presence of an untagged Virtual Logical Area Network data packet when the computer network is a tagged Virtual Logical Area Network.

7. The method as recited in claim 1, wherein a result of one of the performed comparisons produces a result that indicates, as the deviation, presence in the data packet of an unknown Ethernet type, or a false checksum, or a false packet length, or a false packet structure.

8. The method as recited in claim 1, wherein presence of the deviation is detected when:
   (i) the processing circuitry establishes that the data packet is a Dynamic Host Configuration Protocol packet for Internet Protocol Version 4 and/or for Internet Protocol Version 6 including Dynamic Host Configuration Protocol port 67 and/or port 68; or (ii) the processing circuitry establishes that the data packet provides a Transmission Control Protocol or User Datagram Protocol Broadcast message for Internet Protocol Version 4 and/or for Internet Protocol Version 6; or (iii) the processing circuitry establishes a Precision Time Protocol message, the content of which, including time stamp, sequence number, and correction field, is stored at least temporarily in a register for context information.

9. The method as recited in claim 1, wherein for each of at least one of the comparisons, the respective predefined deviation whose presence is determined is a predefined threshold amount of deviation.

10. A device for intrusion detection in a computer network, the device comprising:

a system on a chip system, which includes a hardware switch, the hardware switch including processing circuitry and a plurality of ports to which a plurality of devices are network interconnectable by the processing circuitry of the hardware switch, wherein:

in response to receipt, at an input of the hardware switch, of a data packet that includes a plurality of fields providing respective data link layer information and providing a hardware address, the processing circuitry is configured to select one of the plurality of ports via which to output from the hardware switch the data packet or a copy of the data packet as a function of the data link layer information and the hardware address;

for each of the plurality of fields, the processing circuitry is configured to compare a respective actual value of the respective field to a respective corresponding predefined setpoint value; and the processing circuitry is configured to detect whether there is an intrusion pattern in a network traffic in the computer network in response to satisfaction of a predefined condition that, for any individual one of the comparisons individually, a result of the respective comparison is that there is a predefined deviation of the respective actual value from the respective corresponding predefined setpoint value.

11. The device as recited in claim 10, wherein the hardware switch includes a Ternary Content Addressable Memory, and/or an Address Translation Unit, and/or a Virtual Local Area Network Translation Unit, and/or a Dynamic Host Configuration Protocol filter, and/or a Transmission Control Protocol or User Datagram Protocol filter, and/or a Precision Time Protocol filter with which the processing circuitry is configured to check the data packet for the intrusion detection.

12. A non-transitory computer-readable memory medium on which is stored a computer program that is executable by a computer of a hardware switch, the hardware switch including a plurality if ports to which a plurality of devices are network interconnectable by the computer of the hardware switch, the computer program, when executed by the computer, causing the computer to perform a method for intrusion detection in a computer network, the method comprising the following steps:

in response to receipt, at an input of the hardware switch, of a data packet that includes a plurality of fields providing respective data link layer information and providing a hardware address, selecting one of the plurality of ports via which to output from the hardware switch the data packet or a copy of the data packet as a function of the data link layer information and the hardware address;

for each of the plurality of fields, comparing a respective actual value of the respective field to a respective corresponding predefined setpoint value; and detecting whether there is an intrusion pattern in a network traffic in the computer network in response to satisfaction of a predefined condition that, for any individual one of the comparisons individually, a result of the respective comparison is that there is a predefined deviation of the respective actual value from the respective corresponding predefined setpoint value.

* * * * *